3,739,062
DIRECT CONVERSION OF DAWSONITE
TO PSEUDOBOEHMITE
Leo R. Barsotti, Pleasanton, Calif., assignor to Kaiser Aluminum & Chemical Corporation, Oakland, Calif.
No Drawing. Filed Oct. 5, 1970, Ser. No. 78,176
Int. Cl. C01f 7/02, 7/30; B01j 11/50
U.S. Cl. 423—625          6 Claims

ABSTRACT OF THE DISCLOSURE

Dawsonite in aqueous slurry is hydrothermally treated to obtain pseudoboehmite characterized by a surface area in excess of 250 m.$^2$/g. and an $Na_2O$ impurity level of less than 0.1% by weight. The pseudoboehmite is suitable for the preparation of catalyst supports due to its high surface area, low impurity level and high pore volume.

BACKGROUND OF THE INVENTION

This invention relates to a process for the production of pseudoboehmite from dawsonite. Dawsonite, the general formula of which can be described as $$NaAl(CO_3)(OH)_2$$

is available as a mineral either in relatively pure form or associated with other minerals. It is also manufactured from sodium aluminate solutions, such as obtained from the Bayer process, by the addition of sodium carbonate or by introduction of carbon dioxide gas into the aluminate solution.

Pseudoboehmite is a microcrystalline alumina, and it usually possesses a relatively high surface area and associated with this surface area is high pore volume, which renders this type of alumina eminently suitable for the preparation of catalyst supports. Pseudoboehmite is generally prepared by the reaction of an aluminum salt, such as $AlCl_3$, $Al_2(SO_4)_3$ or $Al(NO_3)_3$ with a strong base; or by the reaction of a strong acid, such as $HNO_3$, HCl or $H_2SO_4$ with a basic aluminum salt, usually sodium aluminate, under carefully controlled pH and temperature conditions. It has already been suggested to obtain alumina from dawsonite by dissolving dawsonite either in an acid or in a base, followed by neutralization of the solution to precipitate hydrous alumina. The preparation of alumina in this manner is associated with many undesirable process details, such as close pH control, handling of acid or base, and also the resultant product is a gelatinous aluminum hydroxide which is difficult to separate and wash.

It has also been suggested to overcome these difficulties, to calcine the solid dawsonite at temperatures in excess of 350° C. and generally between 400–600° C. to decompose it, followed by leaching and drying of the leached product.

This process involves the use of high temperatures, a costly and time consuming leaching step rendering the process economically unattractive.

It has now been surprisingly discovered that hydrous alumina of substantially pseudoboehmitic structure can be produced in a simple and economical process which avoids all the difficulties presented by the prior art methods.

The pseudoboehmite produced can, for example, be utilized in the preparation of catalyst support for automotive exhaust conversion catalysts due to its relatively high surface area, activity and porosity. However, as for any other catalyst application, it is an important consideration to utilize a pseudoboehmite of high purity with a minimum level of impurities. The pseudoboehmite of the present process satisfies all these rigid quality requirements, and it possesses the desired surface area and porosity and also very low impurity content, usually less than 0.1% by weight of the alumina.

BRIEF SUMMARY OF THE INVENTION

A process is provided for the production of pseudoboehmite from dawsonite by the hydrothermal treatment of dawsonite slurries at temperatures below about 150° C. for a time sufficient to convert the dawsonite to pseudoboehmite, followed by separation of the insoluble pseudoboehmite from the aqueous phase. The pseudoboehmite is then washed and, if it is to be employed as a catalyst support, is subsequently subjected to an activation treatment to obtain an alumina characterized by a substantially pseudoboehmitic structure, a surface area of at least 250 m.$^2$/g., a loss on ignition of 20–30% by weight and a residual impurity level of less than 0.1%, consisting mainly of $Na_2O$.

DETAILED DESCRIPTION OF THE INVENTION

This invention relates to the preparation of a gel-derived alumina by the hydrothermal treatment of dawsonite. More particularly, it concerns the preparation of high purity pseudoboehmite.

For the purposes of this application, the expression "substantially pesudoboehmitic structure" or "pseudoboehmite" refers to an alumina dried at 110–120° C. for one hour, having a loss on ignition (LOI) at 1000° C. for one hour between about 20–30% by weight, containing at least about 50% by weight of pseudoboehmite, as determined by intensity of diffraction of copper $K_\alpha$ radiation from the (020) planes, the corresponding interplanar distance being 6.5–6.8 A.

While naturally occurring dawsonite can be utilized in the process of the present invention, due to the mineral impurities associated with the naturally occurring dawsonite, it is preferred to use a synthetic dawsonite. Synthetic dawsonites prepared from sodium aluminate containing solutions and sodium carbonate or carbon dioxide, such as described in U.S. Pat. 2,783,124, are employed with excellent results.

The dawsonite is preferably ground to a fine particle size prior to the hydrothermal conversion of the present invention, and particle sizes below —80 mesh U.S. Standard Screen (screen openings of 0.177 mm. or less) were found to be advantageous.

The ground dawsonite is then slurried with water. In order to avoid introduction of impurities from the water, such as for example Ca, Mg and $SO_4^=$, Cl$^-$ ions, it is recommended that deionized water be employed.

The slurry prepared from the ground dawsonite can contain from about 5 to about 50% by weight of dawsonite calculated on the dry basis (dried at 110–120° C.). For best results, solids contents of from about 5–25% by weight are recommended.

The slurry is then introduced into a vessel which, depending on the temperature employed for the hydrothermal conversion, can be an open vessel or a pressure vessel. The hydrothermal conversion of the dawsonite can be accomplished at temperatures as low as about 80° C., but not in excess of 150° C. Temperature ranges within 90–100° C. were found particularly suitable. At the temperatures indicated, the conversion of dawsonite to pseudoboehmitic alumina is reasonably rapid and, for example, it has been observed that at a temperature of about 95–100° C. the conversion takes place in less than 100 minutes, generally within 60–80 minutes.

Although agitation of the slurry during the hydrothermal conversion is not necessary, an improved rate of conversion can be thus achieved. Naturally, the rate of conversion is mainly dependent on the temperature; thus, at higher treatment temperatures, the rate of conversion is more rapid.

When the hydrothermal conversion is complete, the slurry containing the decomposition products $Na_2CO_3$ and/or $NaHCO_3$, besides the formed pseudoboehmite, is subjected to a separation treatment. A suitable method of separating the pseuboehmite is by simple filtration, followed by washing with deionized water. While generally one wash is sufficient to reduce the residual $Na_2O$ content of the product to about 0.1% by weight, for lower $Na_2O$ contents 2 or 3 washes with deionized water of about 50° to about 100° C., preferably between about 50°–80° C., are recommended. Excessive washing is necessary at temperatures substantially lower than 50° C. Wash water temperatures in excess of about 90° C. may cause aging and reduction in surface area, as well as phase transformation, when the wash water is in extended contact with the product. The washed product can then be dried, usually at temperatures in the range of 105–130° C., resulting in a product of high purity and a surface area in excess of 250 m.²/g. The powdery product of substantially pseudoboehmitic structure can be directly employed for many purposes. It is suitable, for example, for the formation of pellets, spheres, nodules and extrudates. it can be utilized for the preparation of catalyst by impregnation or by simultaneous shaping and impregnation in accordance with the practices of the catalyst industry.

If desired, the dried powder can be, prior to use as a catalyst support, subjected to an activation treatment by heating it to a temperature in excess of 250° C., generally to a temperature between about 300–700° C. This thermal treatment will impart additional desirable properties to the pseudoboehmitic alumina, for example, an increase in strength properties, which are particularly desirable when the alumina is to be utilized in the preparation of catalyst supports. The activated product can be used either in granular or shaped form for the preparation of catalyst supports.

The following examples further illustrate the novel aspects of the present invention.

EXAMPLE I

An aqueous slurry was prepared by admixing 50 grams of dawsonite of the general formula $NaAl(CO_3)(OH)_2$ with sufficient water to produce a slurry of 5% by weight solids content. The aqueous slurry was heated to about 80° C. without agitation and kept at this temperature for about 300 minutes. Subsequently, the hot slurry was filtered and the filtration residue washed with warm (50° C.) deionized water, using two displacement washes. The washed filtration residue was dried at 110–120° C. for about one hour and then analyzed, with the following results:

Alumina phase: Pseudoboehmite
Surface area m.²/g. _____ 300
$Na_2O$ weight percent _____ 0.08
Loss on ignition (LOI) _____ 28.1

After activation at 300° C. for one hour, the surface area was found to be 297 m.²/g.

EXAMPLE II

An aqueous slurry of dawsonite was prepared by admixing 100 grams of dawsonite with sufficient water to produce a slurry of 10% by weight solids content. The slurry was heated to about 100° C. under agitation and kept at this temperature for about 60 minutes, followed by filtration of the hot slurry. The filtration residue was washed with deionized water (50° C.), using two displacement washes, and subsequently dried at 110–120° C. for about one hour. The dried product was thermally treated at 300° C. for about one hour and analyzed.

Alumina phase: Pseudoboehmite
Surface area m.²/g. _____ 288
$Na_2O$ weight percent _____ 0.07
Loss on ignition percent _____ 25.5
Pore volume cc./g. _____ 1.4

EXAMPLE III

An aqueous dawsonite slurry containing 20% by weight solids was heated to about 100° C. and kept at this temperature for about 60 minutes. The slurry was filtered and washed with three displacement washes of deionized water, followed by drying at about 110–120° C. for about one hour. The dried product was thermally treated at 300° C. for one hour and analyzed.

Alumina phase: Pseudoboehmite
Surface area m.²/g. _____ 290
$Na_2O$ weight percent _____ 0.05
Loss on ignition percent _____ 25.1
Pore volume cc./g. _____ 1.4

EXAMPLE IV

An aqueous dawsonite slurry containing about 20% by weight solids was heated to about 150° C. for about 60 minutes. The slurry was filtered, the filtration residue washed with three displacement washes and then dried at 110–120° C. for about one hour, followed by a thermal treatment at 300° C. for about one hour. The product analysis is shown below:

Alumina phase: Pseudoboehmite
Surface area m.²/g. _____ 250
$Na_2O$ weight percent _____ 0.05
Loss on ignition percent _____ 21.2
Pore volume cc./g. _____ 1.3

What is claimed is:

1. A process for the direct hydrothermal conversion of dawsonite of the general formula $NaAl(CO_3)(OH)_2$ to pseudoboehmite, which comprises:
    (a) slurrying dawsonite with water to obtain a slurry having a solids content from about 5 to about 50% by weight;
    (b) heating the slurry to a temperature from about 80° C. to about 150° C. for a time sufficient to convert substantially all of the dawsonite to pseudoboehmite;
    (c) separating the insoluble pseudoboehmite from the soluble reaction by-products; and
    (d) washing and drying of the pseudoboehmite.

2. Process according to claim 1, wherein the slurry has a solids content between about 5 and 25% by weight.

3. Process according to claim 1, wherein the slurry is heated to a temperature between about 90 and about 100° C.

4. Process according to claim 1, wherein the pseudoboehmite is washed with deionized water having a temperature in the range of about 50° C. and 80° C.

5. Process according to claim 1, wherein the pseudoboehmite is dried at about 105–130° C.

6. Process according to claim 1, followed by a thermal treatment at a temperature between about 300° C. and about 700° C.

References Cited

UNITED STATES PATENTS 3,268,295    8/1966    Armbrust, Jr. et al. __ 23—143 X

OTHER REFERENCES

Gerard et al., "Extractive Metallurgy of Aluminum," 1963, p. 103.

MILTON WEISSMAN, Primary Examiner

U.S. Cl. X.R.

252—463; 423—212, 628